United States Patent
Chen et al.

(10) Patent No.: US 10,991,102 B2
(45) Date of Patent: Apr. 27, 2021

(54) IMAGE PROCESSING APPARATUS AND IMAGE PROCESSING METHOD

(71) Applicant: Toshiba Medical Systems Corporation, Otawara (JP)

(72) Inventors: Qi Chen, Chaoyang (CN); Shaobin Wang, Chaoyang (CN); Yongnan Ji, Chaoyang (CN); Jianchun Zhao, Chaoyang (CN)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 508 days.

(21) Appl. No.: 15/452,798

(22) Filed: Mar. 8, 2017

(65) Prior Publication Data

US 2018/0047168 A1    Feb. 15, 2018

(30) Foreign Application Priority Data

Aug. 12, 2016 (CN) .......................... 201610662482.6
Dec. 9, 2016 (JP) ............................. JP2016-239517

(51) Int. Cl.
    *G06T 7/11*    (2017.01)

(52) U.S. Cl.
    CPC ...... *G06T 7/11* (2017.01); *G06T 2207/10081* (2013.01); *G06T 2207/20096* (2013.01); *G06T 2207/30061* (2013.01)

(58) Field of Classification Search
    None
    See application file for complete search history.

(56) References Cited

U.S. PATENT DOCUMENTS

| | | | | |
|---|---|---|---|---|
| 2010/0310146 | A1* | 12/2010 | Higgins | G06T 7/162 382/131 |
| 2013/0211231 | A1* | 8/2013 | Sundarapandian | A61N 5/103 600/411 |
| 2014/0298270 | A1 | 10/2014 | Wiemker et al. | |
| 2016/0093110 | A1* | 3/2016 | Waschbusch | G06T 19/20 382/131 |

FOREIGN PATENT DOCUMENTS

| CN | 102446349 A | 5/2012 |
|---|---|---|
| CN | 103841894 A | 6/2014 |

(Continued)

OTHER PUBLICATIONS

Combined Chinese Office Action and Search Report dated Jul. 30, 2020 in corresponding Chinese Patent Application No. 201710337843.4 (with English Translation of Category of Cited Documents), 13 pages.

(Continued)

*Primary Examiner* — Matthew C Bella
*Assistant Examiner* — Brian D Shin
(74) *Attorney, Agent, or Firm* — Oblon, McClelland, Maier & Neustadt, L.L.P.

(57) ABSTRACT

An image processing apparatus comprises processing circuitry. The processing circuitry is configured to select a specified cross section from three dimensional (3D) image data. And the processing circuitry is configured to perform control so as to form a curve corresponding to a curve delineated on the specified cross section, from the specified cross section to a cross section within a specified range, so as to form curved ace on the 3D image data.

15 Claims, 8 Drawing Sheets

(56) References Cited

FOREIGN PATENT DOCUMENTS

| | | |
|---|---|---|
| CN | 103971372 A | 8/2014 |
| JP | 2012-45256 | 3/2012 |
| JP | 2012-179272 | 9/2012 |
| JP | 2014-525341 | 10/2014 |

OTHER PUBLICATIONS

Japanese Office Action dated Oct. 20, 2020 in Japanese Application No. 2016-239517, citing documents AO-AP and AX therin, 4 pgs.
Medical Imaging Technology vol. 21, No. 2, Mar. 2003, pp. 122-130, with partial English translation. 13 pgs.

* cited by examiner

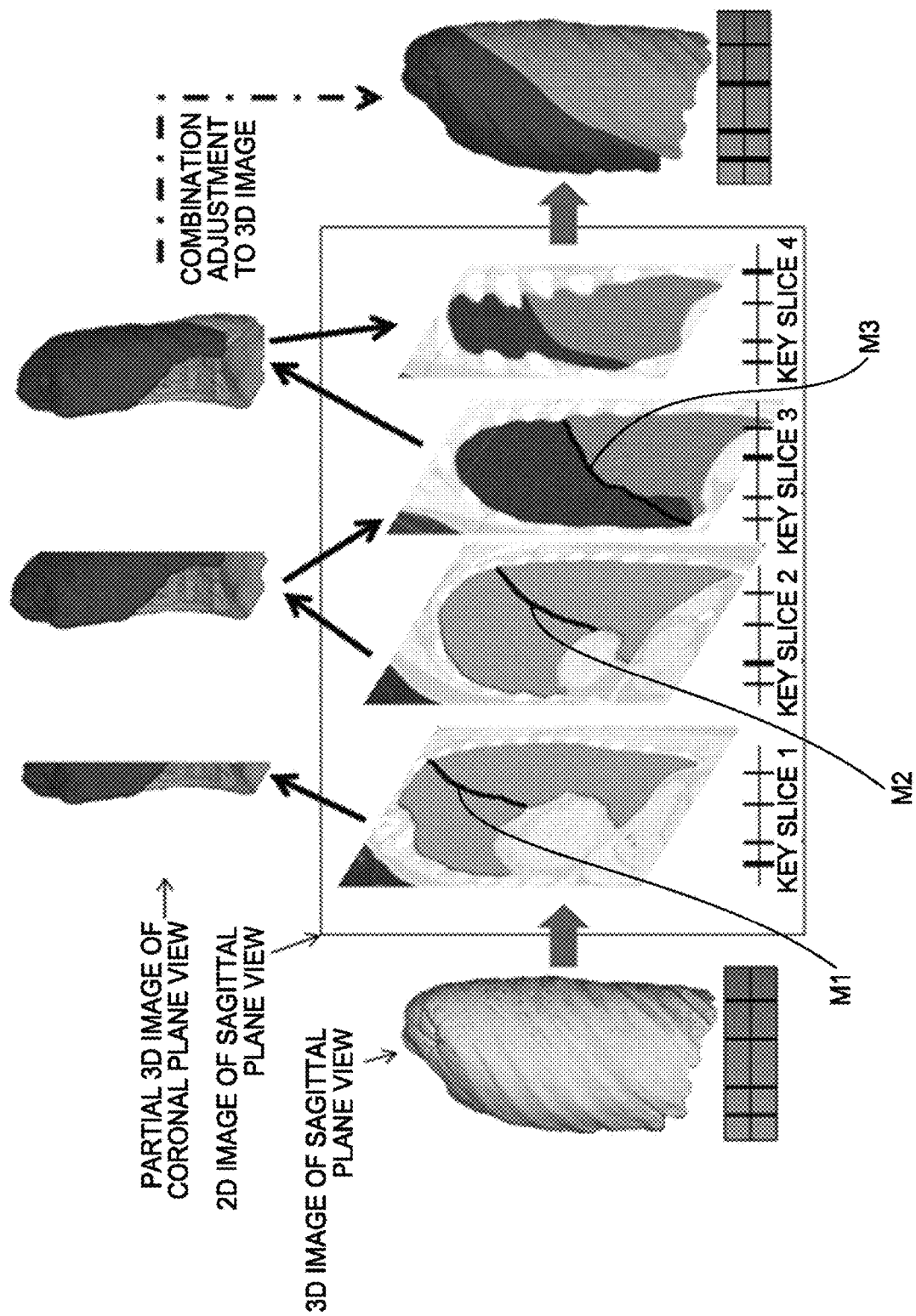

IMAGE PROCESSING APPARATUS AND IMAGE PROCESSING METHOD

CROSS-REFERENCE TO RELATED APPLICATIONS

This application is based upon and claims the benefit of priority from Chinese Patent Application No. 201610662482.6, filed on Aug. 12, 2016; and Japanese Patent Application No. 2016-239617, filed on Dec. 9, 2016, the entire contents of which are incorporated herein by reference.

FIELD

Embodiments described herein relate generally to an image processing apparatus and an image processing method for segmenting image regions.

BACKGROUND

In recent years, as an image recognition technique develops, the techniques of segmenting organ(s) taken in medical images have attracted attention. For example, lung lobe region segmentation technique is of great importance for locating parenchyma lesion and planning lung lobe volume reduction surgery.

The so called lung lobe region segmentation technique is a technique of segmenting a lung region into 5 corresponding lung lobes by detecting interlobar fissures in medical images taken by medical image acquisition apparatus such as CT (Computerized Tomography: Computerized X-ray tomography) etc.

In CT images, interlobar fissures are structures having low resolution and unclear boundary. The surrounding blood vessel and image noises etc. make its detection even more difficult.

In prior art, since it very difficult to obtain a desired result by using an automatic region segmentation, generally, it requires a physician to firstly locate the interlobar fissures in the images based on his experience.

For example, in patent document 1 (US2014/0296270A1), it discloses a region segmentation technique that combines two dimensional (2D) segmentation and three dimensional (3D) segmentation techniques, wherein points are selected by a user in an initial slice (cross section) of a lung, thereby based on the selected points, a 2D segmentation module automatically calculates a curve passing these points as a interlobar fissure on the 2D slice, further, when the user requests the 3D segmentation, a 3D segmentation module performs a simulation based on the segmentation result of the initial slice, resulting in a 3D image candidate. In patent document 1, a calculation result can be corrected by comparing such generated multiple 3D images.

Moreover, in patent document 2 (JP2012-45256), it discloses a region segmentation result correction apparatus, wherein a segmentation interface is automatically generated on a 3D image as a region boundary, and the apparatus allows manual correction of the segmentation interface by the user in the 3D image.

In patent document 1, both the DD segmentation or the 3D segmentation are based on a located points on a single slice input by the user, and are calculated pixel-wise, thereby forming the segmentation curve. However, the precision of this segmentation method is not high, and it cannot distinguish the type of the lung lobe. And if the interlobar fissures in an image are not fully displayed, it is likely net to obtain the desired result.

Furthermore, the automatic segmentation method in patent document 2 also has a relatively large error, it requires a user to correct the generated result and calculate repeatedly, thereby requiring more man-machine interactions. Particularly for those with incomplete interlobar fissures (statistics show that 80% of human being has partly or completely disappeared interlobar fissures), when at least part of the interlobar fissures is invisible in the image, it is very difficult to find the segmentation interface between different regions by using automatic segmentation. Therefore, in prior art, this automatic segmentation cannot achieve the desired result.

BRIEF DESCRIPTION OF THE DRAWINGS

FIG. 9 is an illustration representing the region segmentation process.

DETAILED DESCRIPTION

An image processing apparatus according to embodiments comprises processing circuitry. The processing circuitry is configured to select a specified cross section from three dimensional (3D) image data. And the processing circuitry is configured to perform control so as to form a curve corresponding to a curve delineated on the specified cross section, from the specified cross section to a cross section within a specified range, so as to form curved surface on the 3D image data.

The present embodiment relates to an image processing apparatus for processing images, the image processing apparatus can be implemented by using a device having CPU (central processing unit) to execute software having respective functions of the image processing apparatus, the device being for example an independent computer connected to an image acquisition apparatus such as an X-ray apparatus, and the image processing apparatus can also be implemented in the way of hardware by circuit(s) that perform respective functions of the image processing apparatus. Moreover, the image processing apparatus of the present embodiment can also be installed in the medical image acquisition apparatus in advance as a part of the medical image acquisition apparatus such as CT apparatus or magnetic resonance imaging apparatus.

In the following, preferred embodiments of the present embodiments will be described with reference to the drawings. In the embodiments, taken an imaged subject including the lung and the processing of lung lobe segmentation for the lung image (extracting interlobar fissures) as an example, different embodiments of the region segmentation process will be described.

Furthermore, in different embodiments, like reference numbers are used for like components, and repeated descriptions are appropriately omitted.

Figure 1:
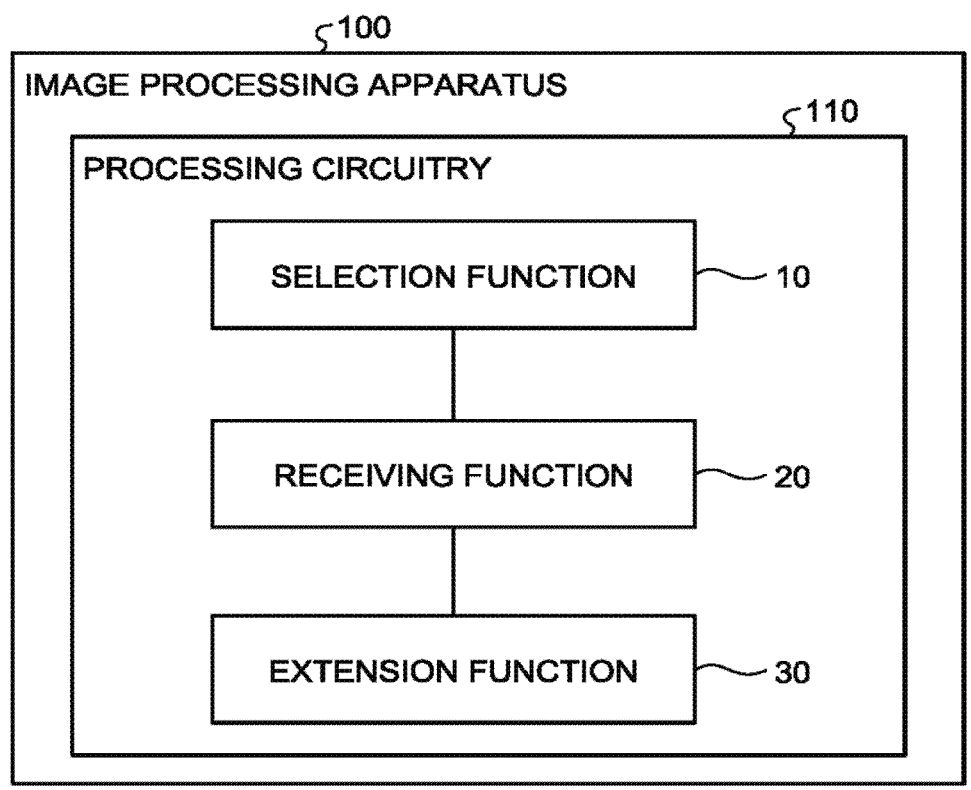
FIG. 1 is a structure diagram representing an image processing apparatus according to a first embodiment.

FIG. 1 is a structure diagram representing an image processing apparatus according to a first embodiment. As shown in FIG. 1, an image processing apparatus 100 includes processing circuitry 110. The processing circuitry 110 is constituted of a selection function 10, a receiving function 20 and an extension function 30.

The selection function 10 selects key specified cross sections) from 3D image data. Specifically, the selection function 10 selects one or more slice as key slices from 3D image data of a lung acquired by using an image acquisition apparatus, such as CT apparatus etc., to image a chest of a subject, thereby displaying the selected key slices as a key slice 2D images on a display such as a monitor connected to the image processing apparatus 100. In the following, a case where the selection function 10 selects a plurality of slices as key slices will be described as an example. The processing circuitry 110 that executes the selection function 10 can be a circuit or software module that implements the above function.

In particular, the selection function 10 can select the key slices using the anatomical information or the geometry information of the subject. Take an example of selecting four key slices in a left lung region, preferably, from a sagittal plane of a 3D image of the left lung, following four slices that parallel to each other are successively selected as the key slices, i.e. successively selecting the slice where the aortic arch has just disappeared while the heart still exists, the slice where the lung region takes the largest ratio of the area of the 2D image, the slice where the heart has just completely disappears and the slice at a middle position of the remaining slices from inside to outside as the key slices. In other words, the selection function 10 selects, from cross sections parallel to the sagittal plane, a slice that does not include the aortic arch and includes the heart of slices adjacent to a slice that includes the aortic arch, a slice in which the area of the lung region is maximized, a slice that does not include the heart of slices adjacent to a slice that includes the heart, and a slice that is located at a middle position of slices that do not include the heart and include the lung, as the key slices.

It is also possible that the selection function 10 selects four slices with an equidistant plane distance along a sagittal axis in the 3D image of the lung ac the key slices. That is, the selection function 10 selects four slices that are parallel to the sagittal plane and have certain intervals between each other. This selection method is very effective in the condition that the type of the lung lobe is not known.

Further, it is also possible that, based on an average segmentation result of the lung obtained previously by statistics and corresponding key slice positions, a general segmentation template is determined and stored, key slices are pre-selected on the general segmentation template, therefore, when the selection function 10 selects the key slices for certain 3D image data, this 3D image data of the lung is directly mapped to the general segmentation template of the lung, so as to select the key slices that correspond to the key slices on the general segmentation template.

The receiving function 20 receives an operation of delineating a curve on a key ice. For example, the receiving function 20 successively receives a delineation of a curve (segmentation curve) for distinguishing different regions in the 2D image of a key slice selected by the selection function 10. In the case where a lung lobe is segmented, the segmentation curve represents the interlobar fissure that divides a lung into multiple lung lobes. The processing circuitry 110 that executes the receiving function 2C can be a circuit or software module that implements the above function.

In particular, a physician can delineate the segmentation curves that represent the interlobar fissures in displayed 2D images of the key slices selected by the selection function 10 based on the appearance of the 2D image and his experience, thereby the receiving function 20 receives the delineated segmentation curves.

The physician can successively delineate the segmentation curves of respective key slices on the 2D images of multiple key slices, the receiving function 20 therefore receives individual segmentation curves corresponding to respective key slices.

The extension function 30 form curves corresponding to the curves delineated on the key slices, from the key slices to one or more slices within a specified range (hereinafter also referred to as cross sections within a specified range or adjacent slices), thereby forming curved surfaces on the 3D image data. That is, the extension function 30 extends the curves of the key slices to one or more slices within a specified range, thereby forming curved surfaces. For example, the extension function 30 extends the segmentation curves of the key slices to one or more adjacent slices that are adjacent to the key slices within a specified range based on the segmentation curves received by the receiving function 20, thereby also forming one or more adjacent segmentation curves on the adjacent slices that correspond to the segmentation curves, by using the key slices and the adjacent slices, partial three dimensional images including 3D interlobar fissures as segmentation interfaces are formed respectively, such that the delineated segmentation curves on the key slices and the adjacent segmentation curves extended in the adjacent slices adjacent to the key slices form a 3D surface in space, thereby forming a segmentation interface that segments a part of lung lobes. The processing circuitry 110 that executes the extension function 30 can be a circuit or software module that implements the above function.

In the example that the selection function 10 selects the sagittal plane slices, the extension function 30 extends the curves delineated in the 2D key slices by the physician (user) to the adjacent slices, performs 2D segmentation in each adjacent slice, then forms a 3D segmentation using respective slices.

The range (specified range) extended by the extension function 30 to the adjacent slices can be a specified distance along axial direction from the key slices.

The extension function 30 can employ existing mapping methods between various different slices. The following method can also be employed.

That is, the extension function 30 extracts multiple key points on the segmentation curve (delineated on the key lives, for example, extracting a start point, an end point and two points between which the variation of the curvature is the largest as the key points, further, locating the adjacent key points on the adjacent slices that corresponds to the key points on the key slices. As for the determination of the adjacent key points, it can be obtained by employing various existing mapping methods between pixels of different layers. The key points on the key slices or the adjacent slices are hereinafter also referred to simply as points.

When the adjacent key points are determined, adjacent key points on a same adjacent slice are sequentially connected according to a sequence of the corresponding key points on the key slice, thereby taking the resulting curve as the interlobar fissure that corresponds to the segmentation curve on the key slice.

As described above, the extension function 30 selects specified number of points from the curve(s) delineated or the key slices, calculates points corresponding to the selected points on the adjacent slices, and connects the calculated points, thereby forming curves on the adjacent slices. The connection manner can be a line connection between two points, or it can be a curved connection according to a certain path planning. For example, if the number of the selected key points is sufficient, they can be connected using straight line between points in a certain direction, to form a whole curve. In other words, the extension function 30 can connect two adjacent points of the adjacent key points using a straight line, thereby forming curves on the adjacent slices. Or a least cost path can be calculated between two adjacent points according to image grayscale, the connection can be made along the calculated least cost path. In other words, the extension function 30 can connect two adjacent points of the adjacent key points using the least cost path for pixel values, thereby forming curves on the adjacent slices. Herein, the least cost path is a path of a plurality of paths connecting two adjacent points that costs the least, based on the pixel value difference between pixels that are included in the path and adjacent to each other, the pixel value difference between each pixel included in the path and its adjacent key point, or the length of the path, for example.

When points on the adjacent slice are connected using a straight line to form curves, for example, the curves formed on the adjacent slice include a broken line. That is, the curves formed on the adjacent slice are not limited to the ones constituted in whole by a line that has no corner and is continuously curved, and may be constituted in whole or in part by a straight line or a broken line. Likewise, the curves delineated on the key slice may be constituted in whole or in part by a straight line or a broken line. Likewise, the curved surfaces formed on the 3D image data may be constituted in whole or in part by one or more pieces of plane data.

Furthermore, with respect to the selection of the specified range of the extension (extension range), it is also possible to take the distance between the current key slice and the edge of the lung or the position of the next key slice as the largest extension distance, within the range of this largest distance, extending outside gradually. Moreover, each time it extends to an adjacent slice, a difference of the pixel value between the key point on the current key slice and the adjacent key point on the adjacent slice is calculated, if the pixel value difference is larger than a preset threshold, it stops the extension and proceeds to the processing of a next key slice. The preset threshold can be arbitrarily determined based on the required precision and the number of the key slices.

Or, no largest extension distance is set and only a threshold of pixel value difference is set, as such, when the extension function 30 extends the segmentation curve in the adjacent slice to a next key slice, i.e. when a next key slice becomes the adjacent slice of a previous key slice, the delineation of the next key slice can also be canceled, or the selection of the key slice can be modified automatically.

The extension range for different key slices can be the same, or different.

The extension function 30 forms curves from key slices to adjacent slices within a specified range, thereby forming curved surfaced on 3D image data. For example, by delineation of the extension function 30, a partial 3D image that corresponds to respective key slices can be generated based on the respective key slices, and this partial 3D image includes the 3D segmentation interface formed by the delineated segmentation curves and the adjacent segmentation curves. Thereby, a segmented partial 3D image can be displayed on a monitor or a display in front of the user for reference by the user. Moreover, when multiple partial 3D images are generated, by displaying these partial 3D images simultaneously, a 3D image of the entire lung structure with interlobar fissures can be seen.

In the first embodiment, the selection function 10 corresponds to the selection process performed by processing circuitry in the claims, the receiving function 20 corresponds to the receiving process performed by the processing circuitry in the claims, and the extension function 30 corresponds to the process of forming curved surfaces performed by the processing circuitry in the claims. In the following, the flow of a segmentation process performed by the image processing apparatus 100 will be described in connection with FIG. 2 and FIG. 3.

Figure 2:
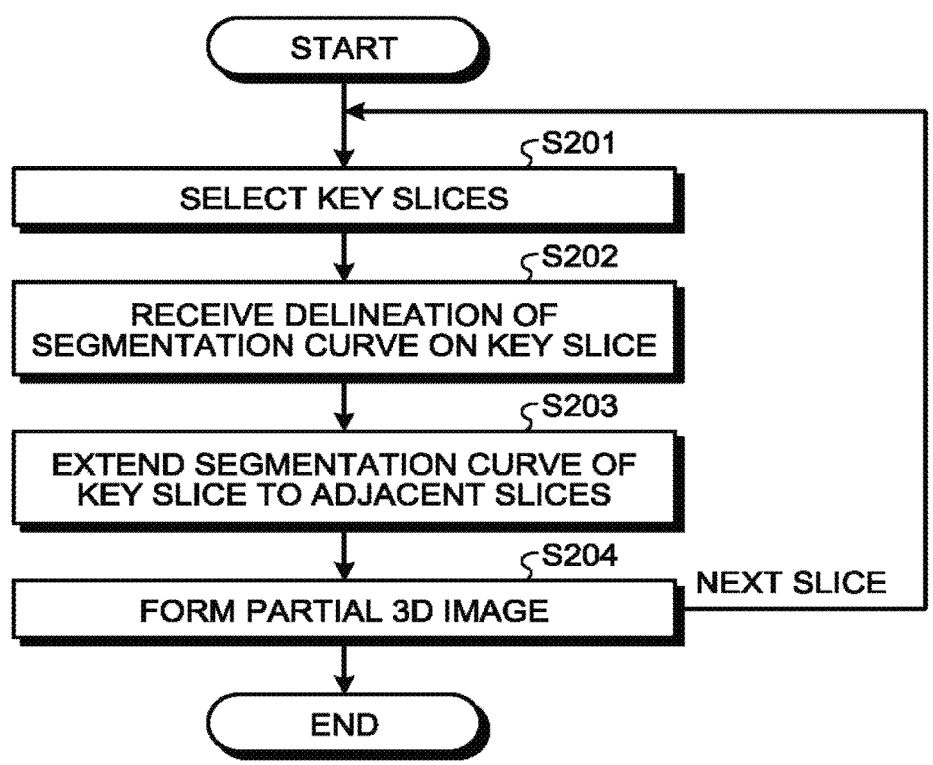
FIG. 2 is a flow chart representing a region segmentation process according to a first embodiment.

FIG. 2 is a flow chart representing a segmentation processing according to a first embodiment. As shown in FIG. 2, when the segmentation starts, first, the selection function 10 automatically selects a plurality of slices in 3D image data of a lung as key slices (step S201).

Figure 3:
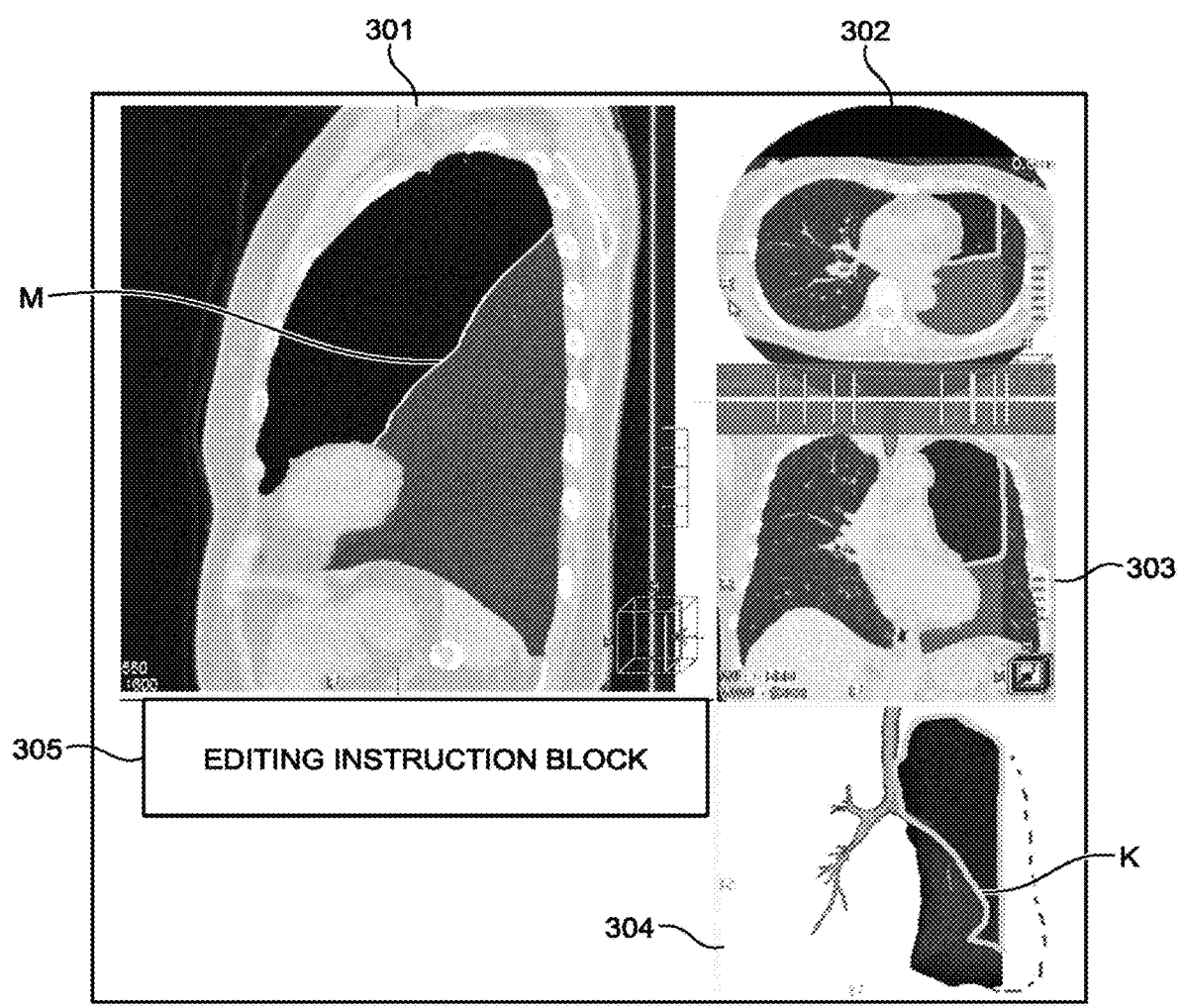
FIG. 3 is exemplary view representing a display interface during the segmentation process according to a first embodiment.

As an example, description will be made by taking the segmentation process of a 3D image of a left lung shown in FIG. 3 as an example. FIG. 3 is an exemplary view representing a display interface during the segmentation process. As shown in FIG. 3, a key slice along the sagittal plane selected on the 3D image data by the selection function 10 is displayed in block 301 as a 2D image.

A physician can delineate on this 2D image a segmentation curve such as the white line M shown in the key slice in FIG. 3, thereby the receiving function 20 receives the delineation of the segmentation curve on the key slice (step S202).

Next, it proceeds to step S203, the extension function 30 extends the segmentation curve on the key slice to adjacent slices before and after the key slice, thereby forming the partial 3D image in the coronal plane view as shown in block 304 of FIG. 3 (step S204). This partial 3D image is displayed in a 3D form in block 304. Moreover, whether in the case of perspective or non-perspective, the position of the segmentation interface K can be confirmed.

In the example of FIG. 3, in addition to the block 301 for displaying the key slice and receiving the user delineated curve and the block 304 for displaying the partial 3D image, there is also an editing instruction block 305 for inputting instructions, 2D display blocks 302, 303 for simulating interface images of the interlobar fissure on a traverse plane and a coronal plane respectively based on the generated partial 3D image. Thereby, the image processing apparatus 100 can provide the extension result of the interlobar fissure to the user in real time. Moreover, by displaying the extension results of respective key slices in one display block in combination, the image processing apparatus 100 can provide a more intuitive and precise lung segmentation result.

Of course, the display interface of the display apparatus is not limited to the layout of FIG. 3, the position of respective blocks can be changed, moreover, the two dimensional display image block 302, 303 can be omitted.

In this embodiment, the selection function 10 selects multiple slices as the key slices, thereby the extension function 30 can generate partial 3D images for respective key slices respectively, such that the positions of the interlobar fissure are more accurate, and will not affect the entirety because of a wrong delineation of a certain curve. Moreover, a user can delineate the whole curve on a 2D image, delineation on a 2D image is more intuitive and convenient, and can further improve the precision of the received delineation curve.

Particularly, in case the imaged subject is an incomplete fissure part of which is disappeared, the physician can perform the curve delineate on a sharper and more intuitive slice according to his experience, such that even the fissure gap disappears or is very ambiguous, it is still possible to determine the position of the interlobar fissures approximately, further, in coordination with the segmentation curves of multiple slices on different positions along the axis direction, the precision of the delineation of the interlobar fissures can be further improved.

In the first embodiment, the selection function 10 selects 4 slices that is parallel to each other and serving as sagittal planes in the 3D image as key slices, however, the number of key slices is not limited to four, and can be arbitrarily set. For example, the selection function 10 selects a plurality of slices including a slice that does not include the aortic arch and includes the heart of slices adjacent to a slice that includes the aortic arch, a slice in which the area of the lung region is maximized, and a slice that does not include the heart of slices adjacent to a slice that includes the heart, as key slices. For example, the selection function 10 selects a plurality of slices including a slice that does not include the aortic arch and includes the heart of slices adjacent to a slice that includes the aortic arch, a slice in which the area of the lung region is maximized, and a slice that does not include the heart of slices adjacent to a slice that includes the heart, as key slices, and further selects a slice that is located at a middle position of slices that do not include the heart and include the lung, as a key slice. Moreover, the selected key slices are not limited to the sagittal plane, and can also be planes of other directions, such as the coronal plane.

Although the case where the selection function 10 selects a plurality of slices that are parallel to each other has been described, the selected key slices are not limited to be parallel to each other, there can be a certain angle between adjacent key slices, in this case, extension function 30 can not only extend parallelly as above such that there are overlaps among multiple partial 3D images but also set different extension boundaries or thresholds on different heights for the generation of partial 3D image.

Furthermore, in the first embodiment, the selection function 10 selects multiple slices as key elites, thereby the extension function 30 successively extends the multiple key slices. However, the selection function 10 can select only one slice as a key slice, and the extension function 30 can form a curved surface on 3D image data based on a curve delineated on the key slice. That is, the extension function 30 can extend only one key slice. For example, in the case where region segmentation is not necessary for the entire lung and it is adequate to perform region segmentation on a partial region of the lung of interest for a physician, only one key slice can be extended, thereby reducing operation performed by the physician. Alternatively, the selection function 10 can also firstly select one key slice to receive the delineation, after the extension function 30 extends the segmentation curve delineated on the selected key slice, the selection function 10 further selects a second key slice based on the result of the first delineation and extension, in a similar way, till the extension to the entire lung is finished, as such, a problem of a selected key slice being not applicable can be avoided. Thereby, system resources can be saved.

The second embodiment is based on the first embodiment, it differs from the first embodiment in that, in the second embodiment, processing circuitry 210 further has an identification function 40. In the following, description will be made primarily for the difference between the second embodiment and the first embodiment, and repeated descriptions are appropriately omitted.

Figure 4:
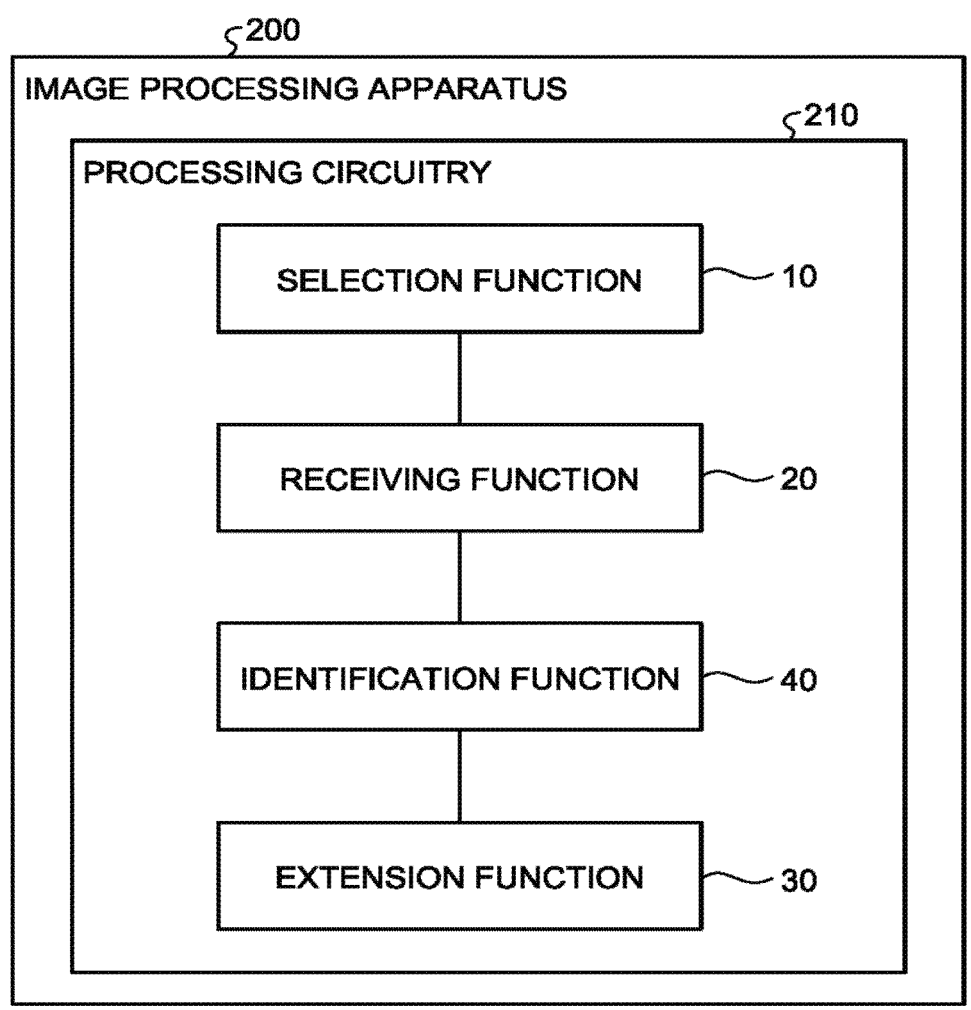
FIG. 4 is a structure diagram representing an image processing apparatus according to a second embodiment.

FIG. 4 is a structure diagram representing an image processing apparatus according to a second embodiment. As shown in FIG. 4, an image processing apparatus 200 includes processing circuitry 210. The processing circuitry 210 is constituted of a selection function 10, a receiving function 20, an extension function 30 and an identification function 40. Wherein the function of the selection function 10, the receiving function 20, and the extension function 30 are the same as that in the first embodiment, thereby detailed descriptions thereof are omitted.

The identification function 40 identifies the type of the curve delineated on a key slice. That is, the identification function 40 can identify the type of the segmentation curve received by the receiving function 20. The processing circuitry 210 that executes the identification function 40 can be a circuit or software module that implements the above function.

Figure 6:
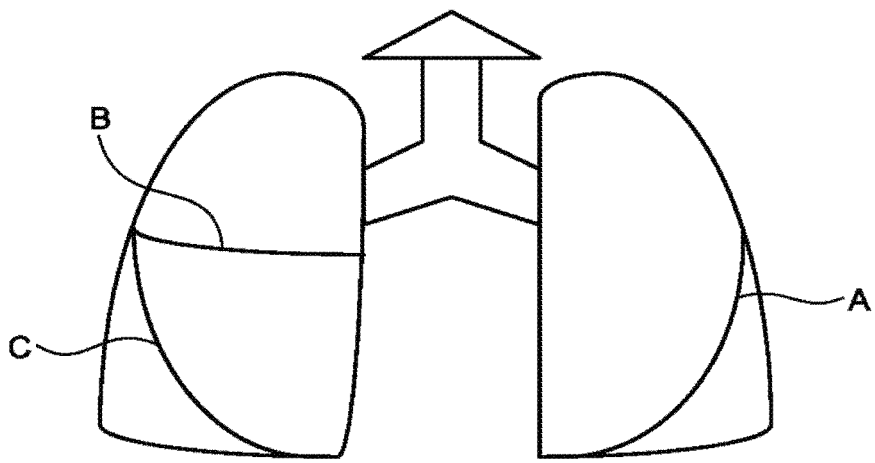
FIG. 6 is a schematic view of the structure of a lung.

Description will be made take the example of the anatomy structure of a lung. FIG. 6 is a schematic view of the lung structure. The lung includes the left lung and the right lung, wherein the left lung includes a superior lung lobe and an inferior lung lobe, the right lung includes a superior lung lobe, a middle lung lobe and an inferior lung lobe. Generally, the interlobar fissures of the lung include three types, in particular, include a left oblique fissure A that separates the left lung into the superior lobe and the inferior lobe, and, an oblique fissure C together with a horizontal fissure B of the right lung that divide the right lung into the superior lobe, the middle lobe and the inferior lobe.

For the user, it is relatively tedious to edit the curve type for each curve, in the present embodiment, the identification function 40 automatically identifies which of the above interlobar fissure types the segmentation curve belongs to, and prompts the user the corresponding type of the interlobar fissure that the curve belongs to.

The identification function 40 can identify the left and right lung according to the position of the delineated curve in the whole lung image. Since the left lung includes the superior lung lobe and the inferior lung lobe, the type of the interlobar fissure has the only one type of the left lung oblique fissure A, hence the segmentation curve identified as belonging to the left lung is classified as be left lung oblique fissure.

Since the right lung includes the superior lung lobe, the middle lung lobe and the inferior lung lobe, in the case where the identification function 40 identifies a right lung interlobar fissure, based on the anatomy structure of the right lung, using the distance between the delineated segmentation curve and a bronchial tree to identify whether it is the right lung horizontal fissure B or the right lung oblique fissure C.

Furthermore, it is also possible that the identification function 40 uses the different characteristics of the right lung horizontal fissure and the right lung oblique fissure for automatic identification, e.g., distinguishing whether it is the right lung horizontal fissure or the right lung oblique fissure based on the oblique angle of the fissure.

In the second embodiment, the selection function 10 corresponds to the selection process performed by the processing circuitry in the claims, the receiving function 20 corresponds to the receiving process performed by the processing circuitry in the claims, the extension function 30 corresponds to the extension process of forming curved surfaces performed by the processing circuitry in the claims, and the identification function 40 corresponds to the identification process performed by the processing circuitry in the claims. In the following, a flow of a segmentation process using the image processing apparatus 200 will be described in connection with FIG. 5.

Figure 5:
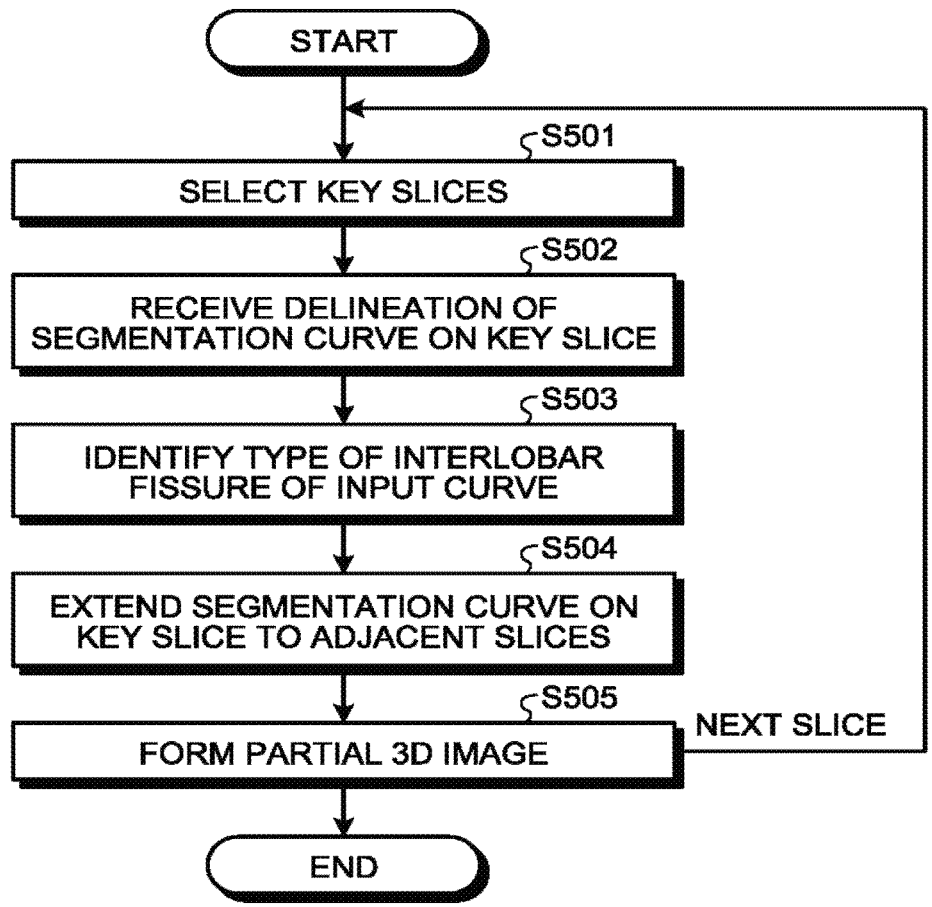
FIG. 5 is a flow chart representing a region segmentation process according to a second embodiment.

FIG. 5 is a flow chart representing a segmentation process according to a second embodiment. As shown in FIG. 5, when the segmentation starts, first, the selection function 10 automatically selects a plurality of slices in 3D image data of a lung as key slices (step S501).

The physician can delineate the segmentation curve (herein representing the interlobar fissures of the lung lobes) that segment different regions on a 2D plane image of a key slice, thereby the receiving function 20 receives the delineation of the segmentation curve on the key slice (step S502).

Next, it proceeds to a step S503, the identification function 40 identifies the type of the segmentation curve received by the receiving function 20 and establishes a correspondence of the identified result and the segmentation curve.

Next, it proceeds to a step S504, the extension function 30 extends the segmentation curve on the key slice to adjacent slices before and after key slice, thereby forming a partial 3D image (step S505). This partial 3D image is displayed to a user together with the type of the identified interlobar fissures.

According to the present embodiment, a same technical effect with the first embodiment can be achieved.

Moreover, the type of the segmentation curve can be identified automatically, thereby the physician does not need to spend time on inputting the type manually, and the segmentation process can be performed more efficiently.

The third embodiment is based on the first embodiment, it differs from the first embodiment in that, in the third embodiment, processing circuitry 310 further has a display function 50 and a combination function 60. In the third embodiment, part of the process performed by the receiving function 20 also differs from that of the first embodiment. In the following, description will be made primarily for the difference between the third embodiment and the first embodiment, and repeated descriptions are appropriately omitted.

Figure 7:
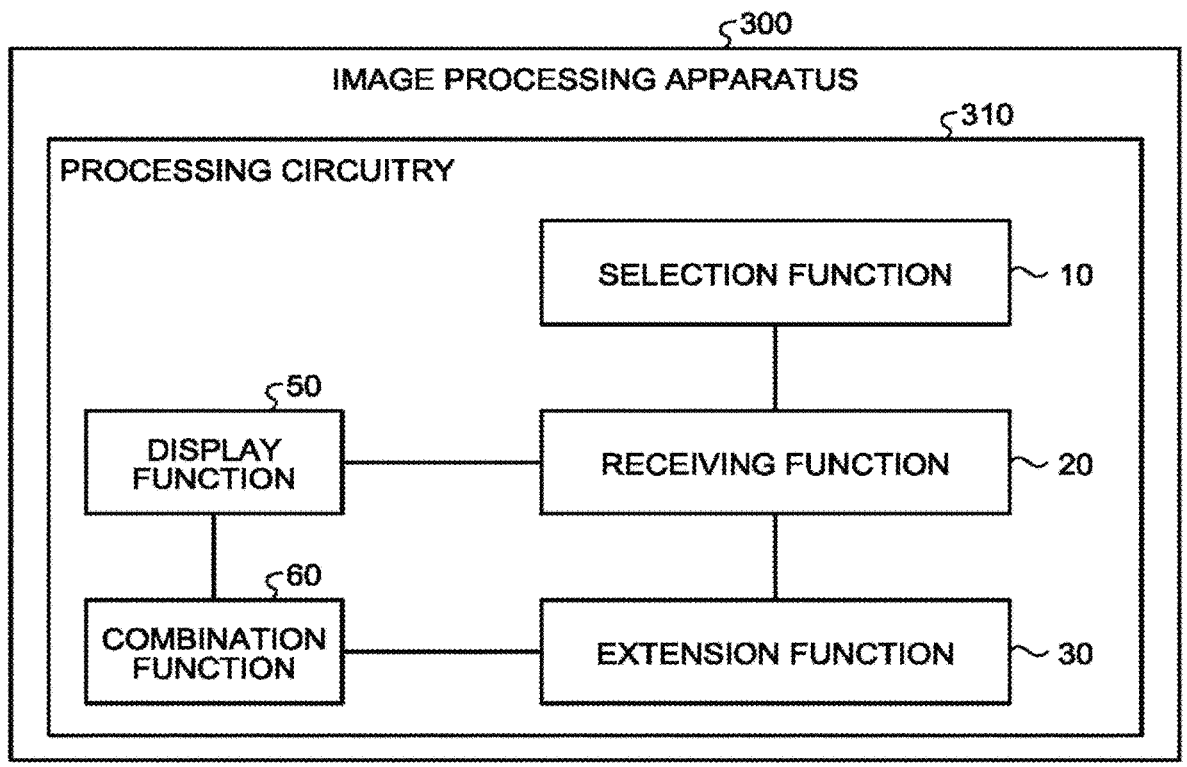
FIG. 7 is a structure diagram representing an image processing apparatus according to a third embodiment.

FIG. 7 is a structure diagram representing an image processing apparatus according to a third embodiment; as shown in FIG. 7, the image processing apparatus 300 includes processing circuitry 310. The processing circuitry 310 is constituted of a selection function 10, a receiving function 20, an extension function 30, a display function 50, and a combination function 60.

A selection function 10 selects a plurality of slices as key slices from lung 3D image data acquired by imaging a chest of an imaged subject by an image acquisition apparatus such as a CT apparatus, thereby displaying the selected key slices as key slice 2D images on a display device such as a monitor connected to the image processing apparatus 300. The processing circuitry 310 that executes the selection function 10 can be a circuit or software module that implements the above function.

Further, the receiving function 20 serves to successively receive a delineation of a segmentation curve for distinguishing different regions on the 2D image of each key slice selected by the selection function 10. In the case where the lung lobe is segmented, the segmentation curve represents interlobar fissures that segments the lung into multiple lung lobes. The processing circuitry 310 that executes the receiving function 20 can be a circuit or software module that implements the above function.

On the basis of the segmentation curve received by the receiving function 20, the extension function 30 extends the segmentation curve in each key slice to its adjacent slice(s) within a specified range adjacent to the key slice, thereby also forming an adjacent segmentation curve corresponding to the segmentation curve and using the key slice and the adjacent sliced to form a partial 3D image including a segmentation interface being a 3D interlobar fissure. That is, the extension function 30 forms a curved surface for each key lice, thereby generating partial 3D image data that corresponds to the key slice and the adjacent slice(s) in the entire 3D image data and in which the curved surface is formed for each key slice. The extension function 30 then forms a partial 3D image based on the partial 3D image data for each key slice. The processing circuitry 310 that executes the extension function 30 can be a circuit or software module that implements the above function.

The display function 50 displays 3D image(s) based on the 3D image data on which the curved surface is formed. For example, the display function 50 enables a real time display of all the generated partial 3D image(s) whenever the delineation of a certain slice is finished. That is, the extension function 30 forms a curve from the key slice to its adjacent slice(s) within a specified range whenever the curve is delineated on the key slice, thereby forming a curved surface on the 3D image data, and the display function 50 displays 3D image(s) based on the 3D image data in the range in which the curved surface is formed. The processing circuitry 310 that executes the display function 50 can be circuit or software module that implements the above function.

The combination function 60 combines pieces of image data with each other. Specifically, the combination function 60 is used for combining multiple partial 3D images generated by the extension function 30, thereby forming a complete lung structure. Particularly, in that case the set extension range is small and it is not continuous between the formed partial 3D images, i.e. in the case where there are gap(s) between the partial 3D images to be combined when combining a plurality of partial 3D images being a part of the lung overall 3D image, the combination function 60 fills the gap(s) by interpolation(s), thereby forming a complete lung 3D image. That is, the combination function 60 combines pieces of the partial 3D image data generated for each key slice while interpolating the gap between pieces of the partial 3D image data. The processing circuitry 310 that executes the combination function 60 can be a circuit or software module that implements the above function.

For example, the set axial extension distance is shorter than half of the plane distance between the key slices, thereby the adjacent slices respectively extended from two adjacent key slices cannot be coherent, so that there is a gap between the formed partial 3D images. In this case, the combination function 60 connects different partial 3D images by interpolating the gap between the two partial 3D images, thereby forming a lung 3D image that includes the complete segmentation interface (interlobar fissures) to prompt to the user. The methods for interpolating include various existing interpolation methods. It is also possible to start from the edge slice of the partial 3D image to further extend towards the gap to fill the gap, by the extension method described in the first embodiment.

The receiving function 20 receives correction(s) to the curved surface formed on the 3D image data. That is, the receiving function 20 can receive correction(s) from a user to the segmentation interface on the 3D image that includes the segmentation interface. The receiving function 20 can receive not only the correction(s) made to the segmentation interface on the partial 3D image displayed in real time by the display function 50 but also the correction(s) to the segmentation interface in the complete 3D image generates by the combination function 60.

Moreover, the receiving function 20 can also receive an indication from the user to abandon the partial 3D image displayed in real time, thereby further receiving the re-delineation for the segmentation curve.

When the receiving function 20 can receive an abandon instruction, or it can be, the selection function 10 stores multiple key slice selection modes in advance, when regenerating segmentation curve for 3D image data of the same imaged subject, different key slice selection mode is used. Specifically, the selection function 10 first stores multiple selection modes based on the positions of the respective key slices selected in the past, for example. Next, the selection function 10 selects multiple key slices of the stored multiple selection modes based on a specified selection mode. When a curve is formed again, the selection function 10 selects multiple key slices of the multiple selection modes based on a selection mode different from the specified selection mode.

In the third embodiment, the selection function 10 corresponds to the selection process performed by the processing circuitry in the claims, the receiving function 20 corresponds to the receiving process performed by the processing circuitry in the claims, the extension function 30 corresponds to the extension process of forming curved surfaces performed by the processing circuitry in the claims, the identification function 40 corresponds to the identification process performed by the processing circuitry in the claims, the display function 50 corresponds to the display process performed by the processing circuitry in the claims, and the combination function 60 corresponds to the combination process performed by the processing circuitry in the claims. In the following, the flow of the segmentation process by the image processing apparatus 300 will be described in connection with FIG. 8 and FIG. 9.

Figure 8:
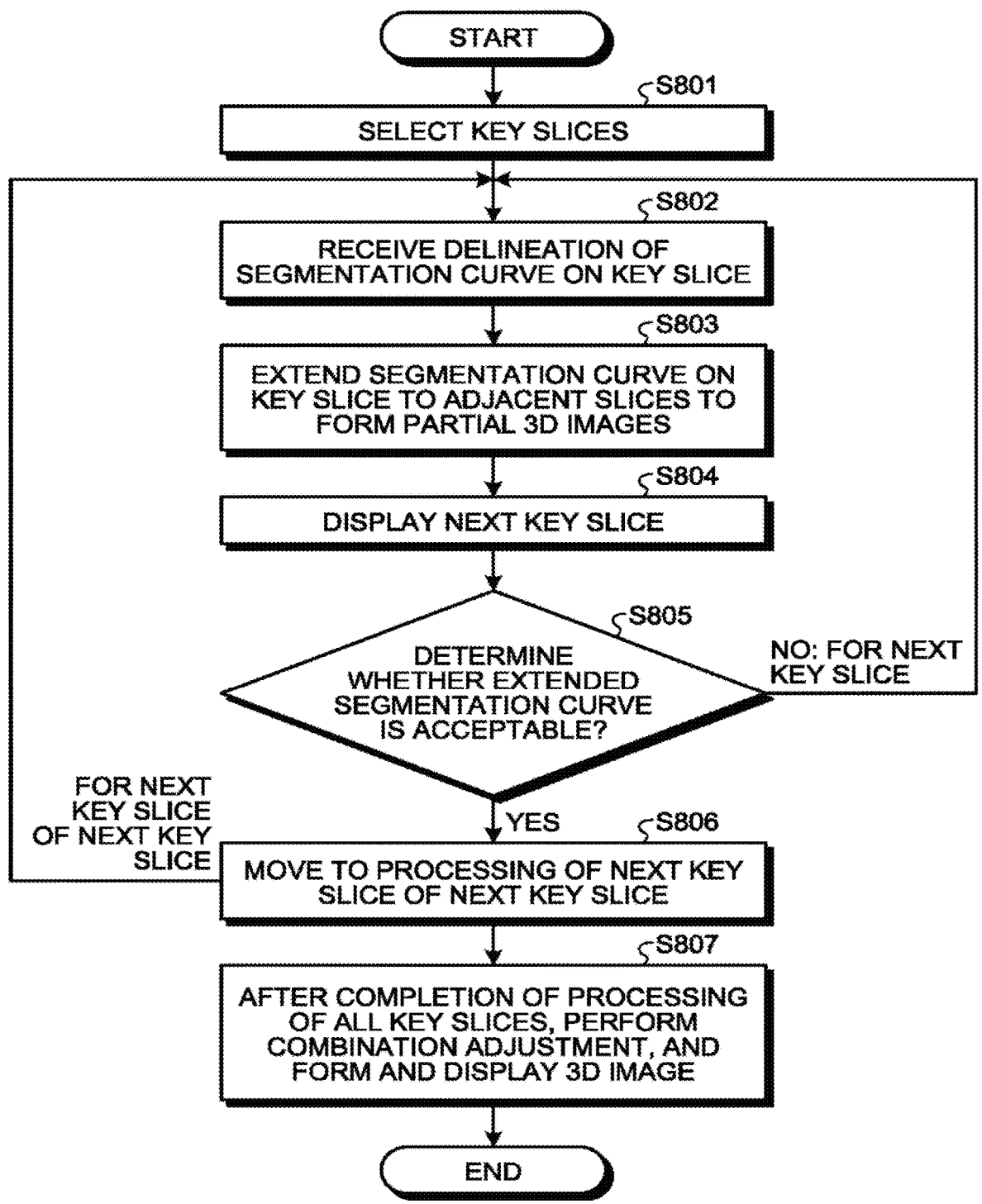
FIG. 8 is a flow chart representing a region segmentation process according to a third embodiment.

FIG. 8 is a flow chart representing a segmentation process according to a third embodiment. As shown in FIG. 8, when the segmentation starts, first, the selection function 10 automatically selects multiple slices in 3D image data of a lung as key slices (step S801).

As an example, description will be made with reference to the segmentation process of a three dimensional image of a left lung shown in FIG. 9. As shown in FIG. 9, the selection function 10 successively selects four sagittal plane slices parallel to each other in the 3D image data of the left lung as a key slice 1, a key slice 2, a key slice 3, and a key slice 4. Herein, in the left side of FIG. 9, it shows the 3D image in the sagittal plane, the selection function 10 selects four sagittal planes parallel to each other in this 3D image as key slices. In the center of FIG. 9, it shows respective key slices, moreover, below the respective key slices, it shows positions of the key slices along an axis vertical to the sagittal plane in the 3D image and the relative distance between the key slices.

First, a 2D plane image of a key slice is displayed on the display device, such that a user can delineate on this 2D plane image a segmentation curve M1, like the black line shown on the key slice 1 in FIG. 9, thereby the receiving function 20 receives the delineation of the segmentation curve M1 on the key slice 1 (step S802).

Next, it proceeds to a step S803, the extension function 30 extends the segmentation curve M1 on the key slice to adjacent slices before and after the key slice, thereby, in a coronal plane view as shown in upper side of FIG. 9, forming the partial 3D image that corresponds to the key slice 1. In the partial 3D image, for distinguishing different regions, different regions are displayed with different grayscales or colors, so that as shown in FIG. 9, it is also possible to explicitly distinguish the position of the segmentation interface in the 3D image.

The display function 50 enables a real time display of the partial 3D image, a physician can confirm the segmentation result of the generated partial image by the partial 3D image displayed on the display device.

Next, the display function 50 displays a next key slice 2 (step S804), in the case where an extended slice of the key slice 1 includes the next key slice 2, the segmentation curve extended from the key slice 1 will also be displayed on the displayed key slice 2, based on the display of the display function 50, the physician can determine whether the extended segmentation curve exists and whether the extension result on the key slice 2 is acceptable (step S805).

In the case where the extension result of the key slice 1 does not involve the key slice 2, that is, no extension curve is formed on the key slice 2, or in the case where the receiving function 20 receives an instruction not to accept the extension result ("no" in step S805), it returns to the step S802, the receiving function 20 receives the delineation of the segmentation curve M2 of the key slice 2.

In the case where the receiving function 20 receives an instruction to accept the extension result ("yes" in step S805), it proceeds to a step S806, the display device displays the next key slice 3, thereby the processing procedure returns to step S302 for the key slice 3 to receive a delineation of a segmentation curve M3 of the key slice 3, and form a partial 3D image corresponding to the key slice 3.

When displaying the key slice 2 or the key slice 3, the display function 50 can also display the partial 3D image that corresponds to the key slice 2 or the key slice 3 in real time, and simultaneously displays the partial 3D images corresponding to respective key slices previously displayed, thereby forming the partial 3D images as shown at top of the FIG. 9.

In the example shown in FIG. 9, it is assumed that for each of the key slice and the key slice 3, the receiving function 20 receives an instruction not to accept the extension result (step S805: no), thereby the key slices 2, 3 need to be delineated, moreover, the extension range of the key slice 3 is large so that it extends to a lung boundary that includes the key slice 4, in the example shown in FIG. 9, only the extended segmentation curve of the key slice 4 is displayed, the instruction whether to accept the extended segmentation curve is directly received by the receiving function 20, in the case where the user accepts the extended segmentation curve, no more delineation for the key slice 4 is made.

By processing respective key slices successively as above, the display function 50 displays the combined form of respective partial 3D images in real time, as shown in upper rightmost side of FIG. 9.

Further, the combination function 60 performs combination adjustments of the three partial 3D images, by interpolating gap(s) therebetween, or a superimposing process for the overlapping portion, and fine tuning the formed segmentation interface, thereby resulting in a smooth connection of the boundaries between the partial 3D images (step S807). Herein, the user can also correct the connected segmentation interface by the receiving function 20. Thereby the segmented 3D image may be obtained as shown in the right most side of FIG. 9.

Furthermore, in the example of the above process, a combination adjustment is performed after the segmentation curve of each key slice has been extended, however, of course it is also possible that each time a partial 3D image is generated, a combination adjustment can be performed on the generated partial 3D image together with the previously generated 3D image(s), such that a user can intuitively see the combined segmented 3D image in respective stages.

According to the present embodiment, a same technical effect with the first embodiment can be achieved.

Furthermore, according to the present embodiment, by combining the receiving function 20 and the display function 50, the partial 3D image can be corrected in real time, as such, the 3D image can be displayed on the display device in a 3D way for confirmation by a physician, if the physician does not accept the extension result of the segmentation interface on the partial 3D image, the corresponding key slice can be re-delineated, thereby the extension function 30 performs extension based on the re-delineated segmentation curve.

Furthermore, according to the present embodiment, particularly for the lung image with incomplete interlobar fissures, the physician is enabled to make delineation and determination on multiple 2D slices, modify the segmentation interface based on the real time combination result, so that even a part of the interlobar fissure is invisible, a relative accurate segmentation result can also be obtained.

Furthermore, according to the present embodiment, a determination can be made for each key slice, if the user is not satisfied with the simulation result of a certain key slice, a 2D delineation of the interlobar fissure is re-preformed, compared with the prior art that re-preforms the delineation after finishing the segmentation of the entire 3D image, the computation cost can also be saved, different lung lobe regions can be more effectively segmented.

The present embodiment will provide a more clear and intuitive guidance for the tissue segmentation of the imaged subject. The user can finish the edition work with fewer efforts, even for the lung with incomplete interlobar fissures, the precision of the segmentation can be improved. The present embodiment is not limited to the various embodiments described above; various variations can also be made.

For example in the above embodiments, a region segmentation process is performed by the coordination of the display function 50 and the combination function 60, however, any components therein can be omitted and it is possible to only use a certain function thereof. Alternatively, the receiving function 20 does not need to receive correction to the curved surface formed on the 3D image data, for example.

Furthermore, the description is made to the imaged subject including the lung and the segmentation process between different lung lobes (extracting the interlobar fissures) for the lung image, but the 3D image data according to the above embodiments may include the whole lung or may include part of the lung. For example, the 3D image data may include only the right lung. The present embodiment can also be applied to segment other organs that include multiple regions, such as a liver, segmentation can be made according to the anatomy and geometry information of the liver. That is, the 3D image data may include the liver in whole or in part.

It can be further used in the segmentation process when extracting the entire organ from the image. For example, when extracting the entire lung or heart on a CT image of the chest, the present embodiment can also be applied. Herein, the delineated segmentation curve can be a closed outline surrounding the organ.

According to the present embodiments, an image processing apparatus and an image processing method that enable a more precise and convenient region segmentation can be provided, the user can perform the editing process more conveniently with less intervention, an intuitive 3D display result can be obtained by the 2D editing. Moreover, the image processing apparatus of the present embodiment can have a real time feedback, thereby further improving the precision of the region segmentation.

The image processing apparatus of the present embodiment can be equipped in the medical device as a circuit that can fulfill the functions described in various embodiments, it can also be issued as a program executable by a computer, stored in a storage media such as magnetic disk (floppy disk (floppy, registered trademark), hard disk etc.), optical disk (CD-ROM, DVD etc.), optical magnetic disk (MO), semiconductor memory, etc.

Moreover, (operating system), database management software, MW (middleware) of network software, etc. operating on a computer based on instructions of a program installed on a computer from the storage media, can also perform a part of various processes for implementing the above embodiments.

Several embodiments of the present invention have been described above; however, these embodiments are presented as examples, and are not intended to limit the scope of the invention. These novel embodiments can be implemented in various other ways, various omissions, equivalences and alternations can be considered without departing from the scope of the spirit of the invention. These embodiments or the variations thereof are included in the scope and spirit of the invention and also included within the scope of the claims and equivalents thereof of the invention.

While certain embodiments lave been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would all within the scope and spirit of the inventions.

What is claimed is:
1. An image processing apparatus comprising:
processing circuitry configured to:
 select a specified cross section from three dimensional (3D) image data including a whole or part of a lung; and
 perform control so as to form in a curve corresponding to a curve delineated on the specified cross section by a user, from the specified cross section to a cross section within a specified range, wherein the cross section within the specified range is different from the specified cross section, so as to form curved surface on the 3D image data, wherein the processing circuitry is configured to select, from the 3D image data, a plurality of cross sections including a cross section that does not include an aortic arch and includes a heart of cross sections adjacent to a cross section that includes the aortic arch, a cross section in which an area of a lung region is maximized, and a cross section that does not include the heart of cross sections adjacent to a cross section that includes the heart, as specified cross sections.

2. The image processing apparatus according to claim 1, wherein the processing circuitry is configured to select a specified number of points from the curve delineated on the specified cross section, calculate points corresponding to the selected points from the cross section within the specified range, and connect the calculated points, so as to form a curve on the cross section within the specified range.

3. The image processing apparatus according to claim 2, wherein the processing circuitry is configured to connect two adjacent points of the calculated points using a straight line so as to form a curve on the cross section within the specified range.

4. The image processing apparatus according to claim 2, wherein the processing circuitry is configured to connect two adjacent points of the calculated points using a least cost path for pixel values so as to form a curve on the cross section within the specified range.

5. The image processing apparatus according to claim 1, wherein the processing circuitry is further configured to receive a correction to the curved surface.

6. The image processing apparatus according to claim 1, wherein the processing circuitry is further configured to identify a type of the curve delineated on the specified cross section.

7. The image processing apparatus according to claim 1, wherein the processing circuitry is further configured to:
display a 3D image based on the 3D image data on which the curved surface is formed;
select a plurality of specified cross sections; and
display the 3D image in a range in which the curved surface is formed whenever the curve is delineated on one of the specified cross sections.

8. The image processing apparatus according to claim 1, wherein the processing circuitry is configured to select a plurality of specified cross sections that are parallel to each other.

9. The image processing apparatus according to claim 1, wherein the processing circuitry is configured to select a plurality of specified cross sections that are parallel to a sagittal plane and have certain intervals between each other.

10. The image processing apparatus according to claim 1, wherein the processing circuitry is further configured to select a cross section that is located at a middle position of cross sections that do not include the heart and include the lung, as the specified cross section.

11. The image processing apparatus according to claim 1, wherein the 3D image data includes a whole or part of a liver.

12. The image processing apparatus according to claim 1, wherein the processing circuitry is configured to select a plurality of specified cross sections based on a specified selection mode, and, when the curve is formed again, select a plurality of the specified cross sections based on a selection mode different from the specified selection mode.

13. An image processing apparatus comprising:
processing circuitry configured to:
select a plurality of specified cross sections from three dimensional (3D) image data;
perform control so as to form a curve corresponding to a curve delineated on the specified cross section by a user, from the specified cross section to a cross section within a specified range, wherein the cross section within the specified range is different from the specified cross section, so as to form curved surface on the 3D image data, wherein the processing circuitry is further configured to form the curved surface for each specified cross section, generate partial 3D image data that corresponds to the specified cross section and the cross section within the specified range in an entirety of the 3D image data and in which the curved surface is formed for each specified cross section; and
combine a plurality of pieces of the partial 3D image data while interpolating a gap between the pieces of the partial 3D image data.

14. An image processing method comprising:
selecting a specified cross section from three dimensional (3D) image data including a whole or part of a lung; and
forming a curve corresponding to a curve delineated on the specified cross section by a user, from the specified cross section to a cross section within a specified range, wherein the cross section within the specified range is different from the specified cross section, so as to form curved surface on the 3D image data, wherein the image processing method further comprises:
selecting, from the 3D image data, a plurality of cross sections including a cross section that does not include an aortic arch and includes a heart of cross sections adjacent to a cross section that includes the aortic arch, a cross section in which an area of a lung region is maximized, and a cross section that does not include the heart of cross sections adjacent to a cross section that includes the heart, as specified cross sections.

15. An image processing method comprising:
selecting a plurality of specified cross section from three dimensional (3D) image data; and
forming a curve corresponding to a curve delineated on the specified cross section by a user, from the specified cross section to a cross section within a specified range, wherein the cross section within the specified range is different from the specified cross section, so as to form curved surface on the 3D image data, wherein the image processing method further comprises:
forming the curved surface for each specified cross section, generate partial 3D image data that corresponds to the specified cross section and the cross section within the specified range in an entirety of the 3D image data and in which the curved surface is formed for each specified cross section; and
combining a plurality of pieces of the partial 3D image data while interpolating a gap between the pieces of the partial 3D image data.

* * * * *